Figure 1:
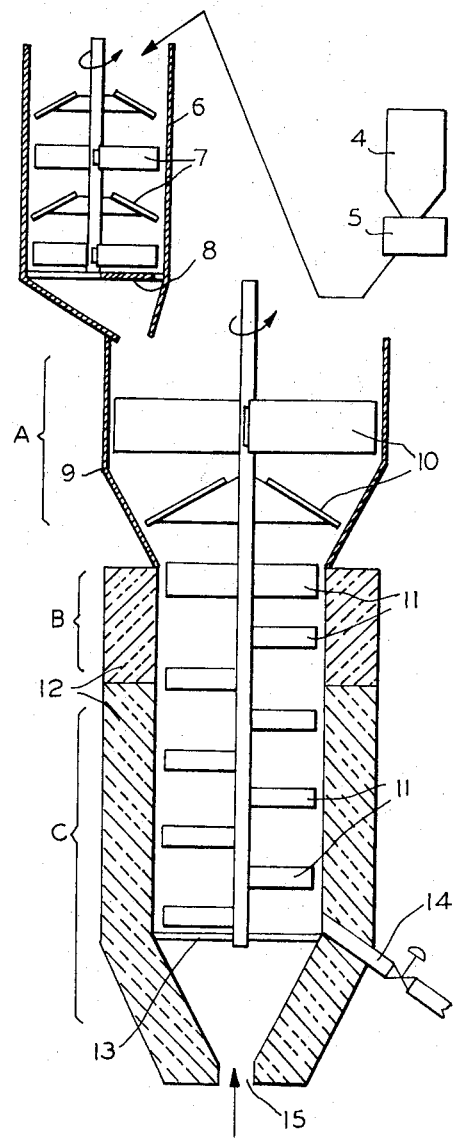

United States Patent

[11] 3,615,598

[72] Inventors Yoshiro Funakoshi
 Kyoto;
 Hiromi Nakatani, Kyoto; Tatsuo Asogawa, Osaka; Takehiko Kajiura, Osaka, all of Japan
[21] Appl. No. 632,601
[22] Filed Apr. 21, 1967
[45] Patented Oct. 26, 1971
[73] Assignee Takeda Chemical Industries, Ltd.
 Osaka, Japan
[32] Priority Apr. 22, 1966
[33] Japan
[31] 41/25774

[54] METHOD FOR PRODUCING MIXED CONDIMENT PARTICLES
 4 Claims, 3 Drawing Figs.
[52] U.S. Cl. ...................................................... 99/140 N, 99/143
[51] Int. Cl. ...................................................... A23l 1/22
[50] Field of Search ........................................... 117/119.6, 119.8; 99/166, 140, 143, 140 N

[56] References Cited
 UNITED STATES PATENTS
 1,662,816  3/1928  Bigelow ...................... 117/119.6
 3,415,665  12/1968 Hussmann .................... 99/199
 3,057,727  10/1962 Shields ........................ 99/56 X
 FOREIGN PATENTS
 1,278,813  12/1960 France ......................... 99/140

Primary Examiner—Morris O. Wolk
Assistant Examiner—Warren Bovee
Attorney—Wenderoth, Lind and Ponack ABSTRACT: Method for producing a powdery-flavor-coated powdery-condiment particle comprising (1) wetting the surface of a powdery condiment material with water or a hydrophilic solvent, (2) contacting the wetted particle with a second powdery condiment material (3) causing the second material to adhere to the wetted particle by drying the mixture with a hot gas of controlled temperature and humidity whereby a uniformly coated condiment particle is formed. Materials used as flavors or condiments include sodium chloride, 5-nucleotides and amino acids.

PATENTED OCT 26 1971  3,615,598

SHEET 1 OF 3

INVENTORS
YOSHIRO FUNAKOSHI
HIROMI NAKATANI
TATSUO ASOGAWA
TAKEHIKO KAJIURA

BY Wenderoth, Lind & Ponack
ATTORNEYS

METHOD FOR PRODUCING MIXED CONDIMENT PARTICLES

This invention relates to a method for producing condiment composition essentially consisting of at least two ingredients selected from flavorous amino acid, flavorous 5'-nucleotide and sodium chloride by a coating process including a specific drying process defined hereinafter.

It has hitherto been known, that when a flavorous 5'-nucleotide is co-employed with monosodium glutamate, a superior flavor enhancing effect is obtained due to the synergistic action and that when sodium chloride is used with the flavorous 5'-nucleotide in an appropriate mixing ratio, a peculiar flavor enhancing effect is also obtained.

At the present time, as a preferable type of condiment having the above-mentioned components, there has been used monosodium glutamate coated with flavorous 5'-nucleotide and sodium chloride coated with monosodium glutamate and/or flavorous 5'-nucleotide.

For producing the above-mentioned condiments by a coating process, there has been practically employed a process comprising, at first, spraying liquid coating agents on a material to be coated or uniformly scattering pulverized solid coating agents on a material to be coated, which is previously dampened, and then, drying the thus treated material by introducing hot air or by heating from outside, in a coating pan, rotary dryer or a fluidizing column.

However, the above-mentioned method has the following defects:

1. The spraying process cannot be conducted before the material so sprayed is dried, since both the spraying process and the drying process are carried out in the same pan, column or drier, and furthermore, in order to coat a desired large amount of the coating agent on the material to be coated, it is necessary to repeat many times the above-mentioned procedures, these repetitions necessarily resulting in taking a rather long period of time for completing the coating.

2. The material to be coated and/or the coating agent are apt to be decomposed or deteriorated, when hot air of rather high temperature is used in order to attain a high thermal efficiency, and the material to be coated is often scattered or broken up, when the amount of the hot air to be introduced is increased for the same purpose.

3. When a large amount of the coating agent is sprayed on the material to be coated, there frequently occurs an agglomeration of the material to be coated and the agglomerated material is dried as it is to give a commercially nonattractive massive final product.

The present inventors have extensively studied these problems to avoid the defects of the known method for producing condiments by coating process, and reached the present invention described hereinafter.

The principal object of the present invention is to provide a method for producing condiments wherein the above-mentioned defects in hitherto known methods are eliminated by employing a coating method including a specific drying process.

The method of the present invention comprises (1) admixing under moist conditions (or, in other words, in the presence of solvent) a material to be coated and a different coating agent, both of which are selected from flavorous amino acid, flavorous 5'-nucleotide and sodium chloride whereby the coating agent adheres to the surface of the material to be coated, (2) contacting the resulting mixture with hot moist gas under such conditions that there is an approximate dynamic equilibrium maintained between the amount of solvent vaporized from the material by heating with the hot moist gas and the amount of liquid condensed from the hot moist gas, and (3) drying the thus treated mixture by heating, whereupon a condiment composition having one component coated with other components is obtained.

The method of the present invention has the following advantages.

1. The method of the present invention effectively prevents agglomeration and adhesion of individual materials to be coated in a drying process.

2. The method of the present invention avoids deterioration of the material to be coated and the coating agent.

3. The method of the present invention requires only a short time for effectively conducting the process.

4. By the method of the present invention, a condiment composition having a very smooth coating layer adhered on its surface can be produced in comparison with that produced by the known methods.

The material to be coated and the coating agent used in the method of the present invention are selected from the group consisting of flavorous amino acid, flavorous 5'-nucleotide and sodium chloride, the flavorous amino acid being exemplified by monosodium glutamate, alanine, glycine, monosodium aspartate, threonine, etc., the flavorous 5'-nucleotide being exemplified by disodium salts of 5'-inosinic acid and 5'-guanylic acid, etc. Namely, among the above groups, one component is selected as the material to be coated, and one or more components other than the one to be coated is (are) used as the coating agent(s).

The condiments produced by the method of the present invention are, thus, exemplified as follows:

1. A condiment essentially consisting of monosodium glutamate coated on its surface with disodium salts of 5'-inosinic acid and/or 5'-guanylic acid;

2. A condiment essentially consisting of sodium chloride coated on its surface with monosodium glutamate;

3. A condiment essentially consisting of sodium chloride coated on its surface with monosodium glutamate and disodium salts of 5'-inosinic acid and/or 5'-guanylic acid.

In the method of the present invention, as the first step, the material to be coated is mixed with the coating agent under moist conditions, or, in other words, in the presence of a solvent.

This process may be carried out by, for example, mixing the material to be coated with a solution or suspension of the coating agent, or wetting the material to be coated by bringing the material in contact with a liquid and then mixing the thus wetted material with a powdery coating agent.

The solvent for dissolving or suspending the coating agent is exemplified by water, methanol, ethanol, acetone, and a mixture of these. Among them, water is most preferable.

The liquid employable for wetting the material to be coated may, for example, be water or such a hydrophillic organic solvent as lower aliphatic alcohols (e.g. methanol, ethanol, propanol, butanol, etc.) and aliphatic ketones (e.g. acetone.).

Among these water is most preferable.

When monosodium glutamate (MSG) is selected as the material to be coated, such procedure may preferably be employed for mixing the MSG and a coating agent whereby the coating agent is mixed with a slurry containing MSG, which is obtained in a course of the production of MSG by a fermentation or obtained by slowly cooling a solution of MSG dissolved in a solvent (e.g. water, a mixture of water and methanol, ethanol, propanol, butanol or acetone) and then subjecting the thus prepared mixture to filtration.

Thus, a treated wet composition in which the coating agent adheres on a surface of the material to be coated is prepared.

An amount of solvent contained in the wet composition is maintained within about 1 to 6, more desirably about 3 to 4 percent (weight/weight) of the material to be coated by controlling the concentration and/or amount of the solution or suspension of the coating agent to be used or the amount of the solvent employed for wetting the material to be coated.

When the amount of the solvent contained in the material to be coated is too small, the coating process is not effectively carried out due to an insufficient moiety of the material to be coated, and when the amount is too large, a smooth product is not obtainable since there occurs agglomeration of the product to be coated in a large amount due to dissolution of the material to be coated and the agglomerated material is dried as it is.

The mixing of the material to be coated and the coating agent may be carried out by conventional means, and a mixing under stirring with aeration is preferably employed. As the material to be coated in the present method, a powdery or granular form thereof may preferably be used, especially not smaller than about 100 mesh (ASTM).

When powdery or granular coating agent is mixed with powdery or granular material to be coated which is previously wetted with a solvent described before, an average diameter of the coating agent is preferably not larger than about one-third of that of the material to be coated.

An amount of the coating agent to be used may be selected so as to make it possible to coat the material to be coated, and is generally preferably about 1 to about 20 percent by weight relative to the material to be coated.

In the method of the present invention, as the second step, the wet composition prepared in the first step is subjected to a contact with hot moist gas under such conditions that there is nearly kept a dynamic equilibrium between an amount of solvent vaporized from the composition by heating with the hot gas and that of liquid condensed from the hot moist gas.

For effectively keeping the dynamic equilibrium, wet composition prepared in the first step is contacted at a temperature of not lower than 20° C. with gas of relative humidity of about 80 to about 95 percent. The term "relative humidity" generally refers to "the ratio of the vapor pressure of water in the gas to the vapor pressure at saturation at the same temperature."

In the present specification and claims, however, the term "relative humidity" is used as meaning "the ratio of the vapor pressure of liquid (including water) in the gas to the vapor pressure of the liquid at saturation at the same temperature." The contact is preferably continued for about 15 minutes to about 1 hour. The upper limit of the contact temperature may be the highest temperature within which the material to be coated and/or coating agent are not decomposed or deteriorated at all, and preferably up to about 100° C. Generally stated, the higher the contact temperature the better efficiency of the specific drying process of the second step. But, practically, the contact may be carried out at a temperature ranging from about 25° C. to about 70° C.

As the hot moist gas, air is most preferably employed, but other inert gas (e.g. nitrogen gas, $CO_2$ gas, etc.) may be used.

By the second step, the coating agent coated on the surface of the material to be coated is allowed to strongly and tightly adhere thereto.

The third step of the present method is to dry the thus treated composition by heating with hot gas. As the hot gas, air is desirably used, but other inert gas (e.g. nitrogen gas, $CO_2$ gas, etc.) may be used. The drying may be conducted by contacting the composition with hot gas of relative humidity of about 1 to about 85 percent, more desirably about 2 to about 82 percent, the temperature of the hot gas being not lower than about 30° C., and practically being about 30° C. to about 100° C. The contact may be continued for about 30 minutes to about 2 hours.

In the method of the present invention, most practically, the process of the second step and that of the third step are continuously carried out by continuously bringing the wet composition prepared in the first step in countercurrent contact with a hot moist gas. Namely, the hot gas is at first brought in contact with the composition having passed through the process corresponding to the second step, whereby the composition is dried while the humidity of the hot gas is increased and the temperature thereof is slightly lowered, and the hot gas after contacted with the above composition, is then brought in contact with the wet composition from the first step which is not yet subjected to a process corresponding to the second step.

Thus, the method of the present invention is advantageously carried out, with the use a vertical mixing column, by continuously supplying the wet composition prepared in the first step through the upper part of the column and on the other hand continuously introducing a hot gas through the lower part of the column under specific conditions as mentioned hereinbefore, whereby the composition is continuously contacted in countercurrent with the hot gas.

Of course, however, the present method may be carried out in a batchwise manner by appropriately adjusting temperature and relative humidity of the hot gas introduced through the lower part of the column.

When the method of the present invention is continuously carried out by the use of a vertical mixing column, a wet composition prepared in the first step is introduced in the column from the top thereof, and is subjected to a process corresponding to the aforementioned second step at the upper part of the column, and subsequently falls downward to the lower part of the column, wherein the composition is subjected to a process corresponding to the aforementioned third step.

In order to effectively conduct these processes, it is necessary to control operation conditions so as to allow each of the two processes to be carried out under such conditions as previously mentioned. For this purpose, such operation conditions are appropriately selected as humidity of the wet composition charged from the top of the column, a relative humidity, a temperature and a feed rate of the hot gas to be fed from the bottom of the column, and, if necessary, a contact period of time between the wet composition and the hot gas. More strictly stated, a hot gas of a temperature of not lower than about 30° C., more desirably about 40° C. to about 80° C., and of a relative humidity of about 1 to about 70 percent, more desirably about 2 to about 25 percent, is continuously fed into the column from the bottom thereof under such feed rate as around or a little lower than a minimum fluidization velocity of the wet composition to be fed, generally about 0.5 to about 300 cm./sec. On the other hand, the wet composition prepared in the first step, which contains a solvent in about 1 to about 6, more preferably, about 3 to about 4 percent (weight/weight) relative to the material to be coated, is continuously fed to the column from the top thereof. A feed rate of the wet composition is preferably determined so as to adjust a total contact period between the composition and the hot gas in the column at about 1 to about 3 hours. Thus, the wet composition is continuously contacted with the hot gas in countercurrent in the column. In the lower part of the column, the hot gas is continuously contacted with the wet composition after having passed through the process corresponding to the second step, whereupon the composition is dried under such conditions as described hereinbefore. After the contact as mentioned just above, the hot gas shows such characteristics (i.e. temperature and relative humidity) as defined for the second step, and goes upward towards the upper part of the column, in which the gas is continuously contacted with the wet composition, whereby the latter is subjected to a process corresponding to the second step under such conditions as described before.

If necessary, the inner temperature of the upper part of the column may be adjusted as desired to within a range of about 10 to 80° C. by heating or cooling outside the column.

Thus, the objective condiment composition, in which one component is tightly and smoothly coated with one or more other components on its surface, is continuously obtained from the bottom of the column.

Figure 2:
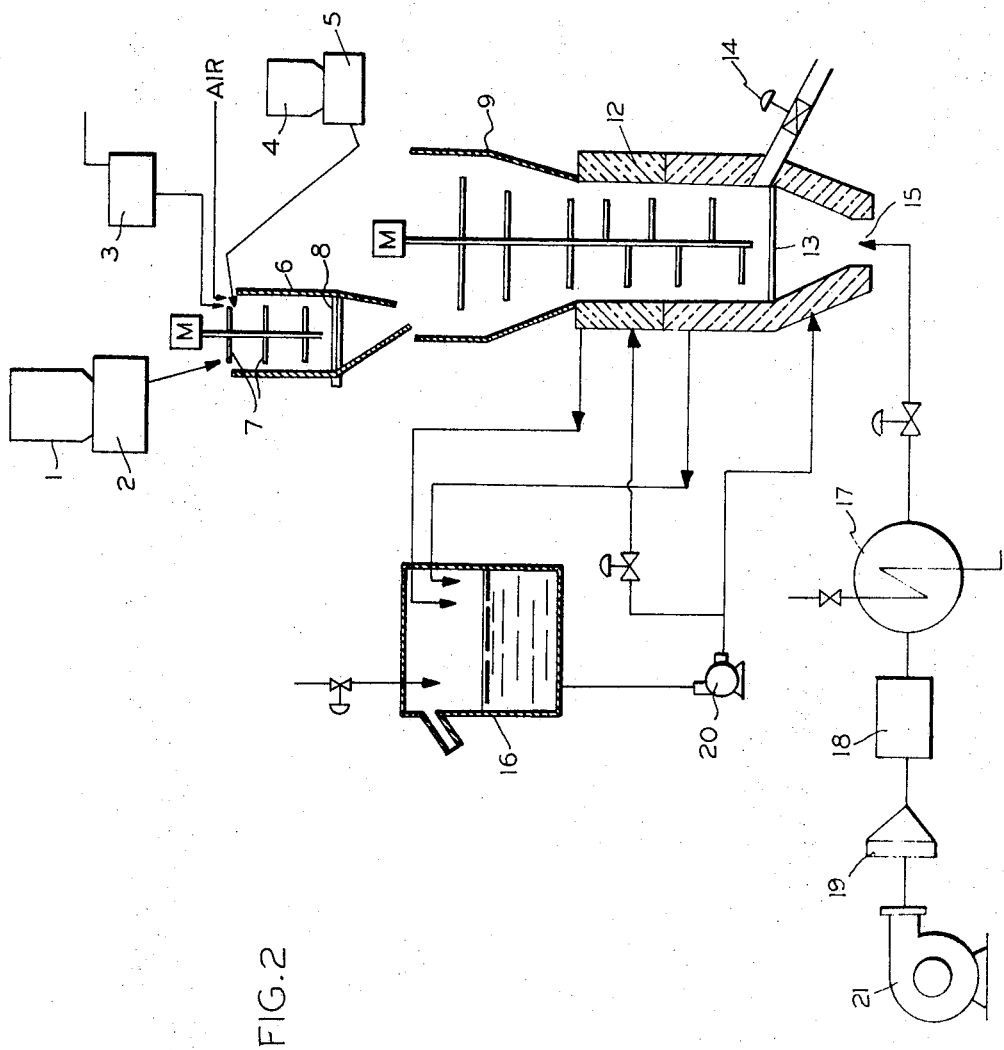
Figure 3:
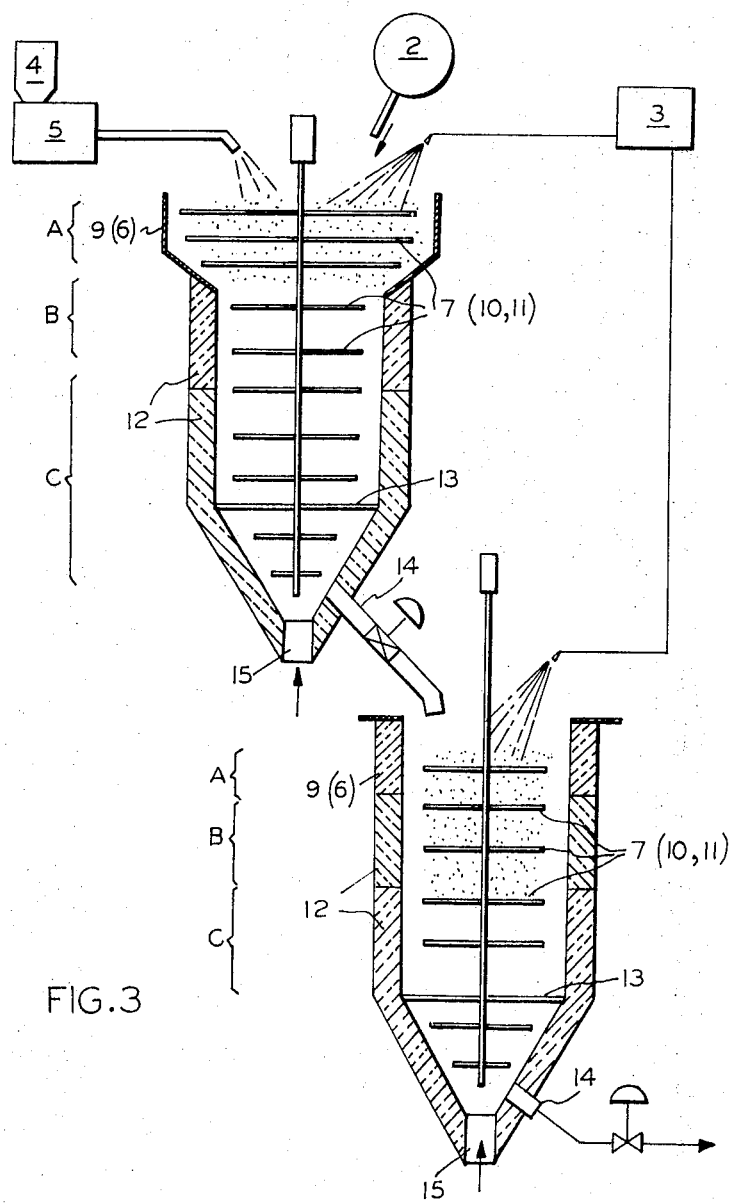

Hereinafter, the above-mentioned continuous process of the present invention is described referring to the figures. X FIG. 1 shows a cross-sectional view of a main part of an example of an apparatus employable in the method of the present invention, FIG. 2 shows a cross-sectional view of an example of a total continuous apparatus employable in the method of the present invention and FIG. 3 shows a cross-sectional view of an example of a continuous multistage coating apparatus employable in the method of the present invention.

In those Figures, 1 shows a hopper to which a material to be coated is supplied, 2 shows a feeder for quantitatively supplying a material to be coated, 3 shows a tank for spraying a solvent, 4 shows a hopper supplying a coating agent, 5 shows a feeder for quantitatively supplying the coating agent, 6 shows a column wherein a material to be coated is wetted with a solvent and is mixed with the coating agent, 7 shows a stirring wing, 8 shows a slit, 9 shows a column wherein a process corresponding to the second step and that of the third step are carried out, 10 and 11 show stirring wings, 12 shows a heat jacket, 13 shows a porous plate or a plane supporting a stirring axis, 14 shows an outlet for the finished products, 15 shows an inlet for a hot gas, 16 shows a hot water tank, 17 shows a heat exchanger, 18 shows an air conditioning device, 19 shows a dust removal device, 20 shows a circulating pump and 21 shows a blower.

A material to be coated is supplied to the column 6 through the hopper 1 and the feeder 2, and, on the other hand, a solvent for wetting a material to be coated is sprayed from the tank 3 into the column 6 wherein the material is wetted with the solvent and mixed with the coating agent.

The material thus wetted and mixed is supplied to the column 9 through the slit 8. A coating agent is also supplied to the column 6 or 9 through the hopper 4 and the feeder 5.

On the other hand, hot gas is introduced through an inlet 15 and rises through the column 9. In the part of A of the column 9 as shown in the Figures, the material to be coated is admixed with the coating agent to give wet composition wherein the coating agent adheres on the surface of the material to be coated. The composition thus prepared is transferred to the parts shown as B in the Figures and then to the part shown as C in the Figures. The column 9 is kept warm with heat jacket 12.

The wet composition transferred to in the part B is brought in contact under stirring for a constant period with the hot gas having increasing relative humidity, which has ascended through the part C, whereby the process corresponding to the second step is conducted.

The composition after being subjected to the process is transferred to the part C wherein the composition is brought in contact with the hot gas ascending from the lower part of the column 9, whereby the process corresponding to the third step is conducted.

The product thus prepared is taken out from the outlet 14.

With the use of these apparatuses, the method of the present invention is continuously carried out by selecting appropriately within the above mentioned conditions the ratio of the amount of solvent supplied to the column 6 to the amount of the material to be coated, the staying period of the material to be coated and the coating agent in the column, and temperature, relative humidity and amount of hot gas introduced from the lower part of the column.

Under such conditions as listed in the following table the method of the present invention is carried out by the use of the aforementioned apparatus:

monosodium glutamate of mesh (ASTM) size 28 to 100 is constantly supplied in an amount of 1 kilogram per minute to the column 6 (diameter: about 40 cm., and height: about 150 cm.) and stirred while being sprayed with water at a rate of 40 grams per minute. The humid granules of monosodium glutamate thus obtained are supplied to the upper part of the column 9 (diameter: about 40 cm., and height: about 150 cm.) in an amount of 1.04 kilograms per minute.

In the column 9, agitation is carried out while supplying therein a hot gas of 80° C. of 2 percent relative humidity at a rate of 63.0 N m.³/hr. through the inlet 15, and a powder of 5'-vibonucleotide (a mixture of equal amounts disodium salt of 5'-inosinic acid and disodium salt of 5'-guanylic acid), which is smaller than 100 mesh, is supplied at a rate of 80 grams per minute to the upper part of the column 9.

A temperature and a humidity of the B part of the column 9 are maintained at 50° C. and 80 percent of relative humidity with both the hot gas introduced through the bottom of the column 9 and the heat jacket 12. In such a manner, dried products consisting of monosodium glutamate coated with 7.4 percent by weight of 5'-ribonucleotide relative to the total amount of the products can continuously be obtained in a yield of 1.08 kilogram per minute from the bottom of the column 9.

The dried products thus obtained have a coating ratio of 98.0 percent relative to the amount of 5'-ribonucleotide employed and dried products having a mesh size of 20 to 100 are obtained in a yield of above 97 percent relative to the total amount of the dried product.

EXAMPLE 2

Employing only the upper column shown in FIG. 3, 8 kilograms of sodium chloride mesh size of 32 to 100 are charged in the column and a hot gas of 50° C. and relative humidity of 8 percent is introduced at a rate of 18 Nm.³/hr. through the bottom of the column under agitation and 320 grams of a 25 percent aqueous solution of monosodium glutamate are sprayed therein.

The aeration is continued under agitation for 50 minutes after the spraying to give dried products consisting of sodium chloride coated with 1 percent by weight of monosodium glutamate relative to the total amount of the dried products in a yield of 96 percent relative to the total amount of sodium chloride and monosodium glutamate employed.

EXAMPLE 3

Employing the same column as example 2, 9.4 kilograms of

TABLE

| Example | A | B |
|---|---|---|
| Material to be coated | MSG (28–100 mesh) 1.0 kilogram per minute. | NaCl (32–100 mesh) 1.0 kilogram per minute. |
| Coating agent | Ribo (100 mesh pass) 80 grams per minute. | MSG and Ribo (2:1 by weight) 176 grams per minute (150 mesh pass). |
| Solvent for wetting | 40 grams per minute H₂O | H₂O 60 grams per minute. |
| Temperature of hot gas in the inlet of column. | 80° C | 60° C. |
| Relative humidity of hot gas in the inlet of column. | 2 percent | 7 percent. |
| Feed rate of the hot gas | 63.0 N m.³/hr. (14 cm./sec.) | 158 N m.³/hr. (35 cm./sec.). |
| Total period for contact of the material to be coated with the hot gas. | 1.5 hours | 2 hours. |
| Temperature in the process corresponding to the second step. | 50° C | 35° C. |
| Relative humidity in the process corresponding to the second step. | 80 percent | 95 percent. |
| Amount of product taken out from the outlet. | 1.08 kilogram per minute | 1.18 kilogram per minute. |

Remarks:
MSG : monosodium glutamate
Ribo : a mixture of equal amounts of disodium salt of 5'-inosinic acid and disodium salt of 5'-guanylic acid.

EXAMPLE 1

Employing the apparatus shown in the FIGS. 1–3, monosodium glutamate (MSG) of mesh size 24 to 65 are charged in the column. Then 1 liter of 70 percent hydrous methanol (volume/volume) is sprayed therein under agitation. 600 grams of 5'-ribonucleotide of mesh size 150 to 200 (105–74 µ) are mixed with the above treated MSG. After that, a hot gas of 50° C. and relative humidity of 8 percent is introduced at a rate of 35 Nm.³/hr. (about 8 cm./sec.) from the bottom of the column. The aeration is continued under agitation for 1 hour.

Thus 9.9 kilograms of the dried products is obtained in a yield of about 99 percent relative to the total amount of monosodium glutamate and 5'-ribonucleotide employed.

What we claim is:

1. A method for producing a powdery condiment composition wherein sodium chloride as a powdery material to be coated is coated with at least one of flavorous 5'-nucleotides and flavorous amino acids as powdery coating agent, or wherein a flavorous amino acid as a powdery material to be coated is coated with a flavorous 5'-nucleotide as a powdery coating agent, which method comprises (1) wetting the surface of about 80–99 parts by weight of the powdery material to be coated with about 3–6 percent, by weight of the powdery material to be coated, of at least one of water and a hydrophilic organic solvent as wetting agent, (2) admixing about 1–20 parts by weight of the powdery coating agent with the wetted powdery material to be coated, (3) allowing the coating agent to adhere to the surface of the material to be coated by contacting the mixture of step 3 with a hot gas whose temperature and relative humidity are about 20–100° C. and about 80–95 percent respectively, and (4) drying the resultant material by contact with a hot gas whose temperature and relative humidity are about 30–100° C. and about 1–85 percent respectively.

2. A method as claimed in claim 1, wherein the material to be coated is monosodium glutamate and the coating agent is at least one of disodium salts of 5'-inosinic acid and 5'-guanylic acid.

3. A method as claimed in claim 1, wherein the material to be coated is sodium chloride and the coating agent is monosodium glutamate.

4. A method as claimed in claim 1, wherein the wetting agent is water.